United States Patent [19]
Kimura et al.

[11] Patent Number: 5,852,694
[45] Date of Patent: Dec. 22, 1998

[54] HIGH POWER FIBER OPTIC CONNECTOR

[75] Inventors: Koji Kimura, Nishinomiya; Tokuji Hayashi, Takarazuka; Masayoshi Hachiwaka, Tokyo; Takeshi Satake, Yokohama, all of Japan

[73] Assignee: Mitsubishi Cable Industries, Ltd., Amagasaki, Japan

[21] Appl. No.: 889,371

[22] Filed: Jul. 8, 1997

[30] Foreign Application Priority Data

Jul. 10, 1996 [JP] Japan ................................. 8-201251

[51] Int. Cl.⁶ .................................................. G02B 6/36
[52] U.S. Cl. .............................................. 385/78; 385/88
[58] Field of Search ............................. 385/67, 88, 86, 385/73, 78

[56] References Cited

U.S. PATENT DOCUMENTS

| | | |
|---|---|---|
| 4,747,659 | 5/1988 | Takahasi ................................. 385/67 |
| 4,895,425 | 1/1990 | Iwano et al. . |
| 5,066,094 | 11/1991 | Takahasi ................................. 385/73 |
| 5,181,267 | 1/1993 | Gerace et al. . |
| 5,212,752 | 5/1993 | Stephenson et al. ..................... 385/78 |
| 5,436,994 | 7/1995 | Ott et al. ................................. 385/86 |
| 5,682,451 | 10/1997 | Lee et al. ................................. 385/78 |

*Primary Examiner*—John D. Lee
*Assistant Examiner*—Juliana K. Kang
*Attorney, Agent, or Firm*—Armstrong, Westerman, Hattori, McLeland & Naughton

[57] ABSTRACT

A high power fiber optic connector detachably attached to a connected cylindrical portion having an axial hole portion, a male screw portion, and a key way. This fiber optic connector is provided with a ferrule portion to be inserted into said axial hole portion, a cap nut to be engaged with said male screw portion, and a positioning key portion to be inserted into said key way. This key portion is fixed to be freely changed in a circumferential direction of said ferrule portion.

2 Claims, 6 Drawing Sheets

HIGH POWER FIBER OPTIC CONNECTOR

BACKGROUND OF THE INVENTION

1. Field of the Invention

This invention relates to an accurate optic connector for connecting an optical fiber which transmits a high-energy beam such as a YAG laser beam.

2. Description of the Related Art

In general, an optic connector is attached to an incident end of an optical fiber for transmitting a high-energy laser beam in order that the optic connector is connected with a receptacle (with a built-in lens) attached to a laser apparatus.

A conventional receptacle (as a counterpart member) is provided with a connected cylindrical portion having an axial hole portion, a male screw portion, and a key way, and a ferrule portion to be inserted into the axial hole portion of the connected cylindrical portion, a cap nut to be engaged with the male screw portion, and a positioning key portion to be inserted into the key way are arranged at an optical connector side of the receptacle which optical connector is detachably attached to the connected cylindrical portion. The positioning key portion at the optical connector side is (directly or indirectly) fixed on the ferrule portion and keeps a fixed position in a circumferential direction from the ferrule portion. For example, the key portion integrally projects from an end of a connector main body and is located at a fixed position in a circumferential direction on an axis of the connector main body (the ferrule portion).

In order that a high-energy laser beam such as a YAG laser beam is condensed through the lens at the receptacle side and is efficiently incident to (an end face of) the optical fiber which is inserted into the connector and is adjacent to an end face of the ferrule, it is extremely important to conduct optical axis adjustment (optical axis correction) in which optical axes of the optical fiber and the lens are arranged to coincide with each other.

For example, in the case where the optical fiber has a core diameter of 200 μm to 400 μm, the optical axes need to be corrected within tens μm through the optical axis adjustment, and higher transmission efficiency is obtained the more the accuracy is increased.

In operating the optical axis adjustment, the connected cylindrical portion and the built-in lens of the receptacle are relatively and finely moved in a direction of a plane that intersects perpendicularly with their axes, and the optical axis (the axis) of the optical fiber in the ferrule connected to the receptacle and the optical axis of the lens thereby coincide with each other. In exchanging the (damaged) optical fiber after usage of a predetermined period, a connector attached to an end portion of a new optical fiber needs to be operated similar optical axis adjustment.

The eccentric position of the axis of the optical fiber adjacent to the ferrule distal end from the (fixed) key portion of the connector varies and not fixed at all, therefore the foregoing bothersome optical axis adjustment is required any time the optical fiber and the connector are exchanged.

It is therefore an object of the present invention to provide an optic connector wherein the foregoing bothersome optical axis adjustment can be omitted.

It is another object of the present invention to provide an optic connector wherein in case of connecting an optical fiber and an optical fiber, respective optical axes of the optical fibers are easily arranged to coincide with each other with high accuracy.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
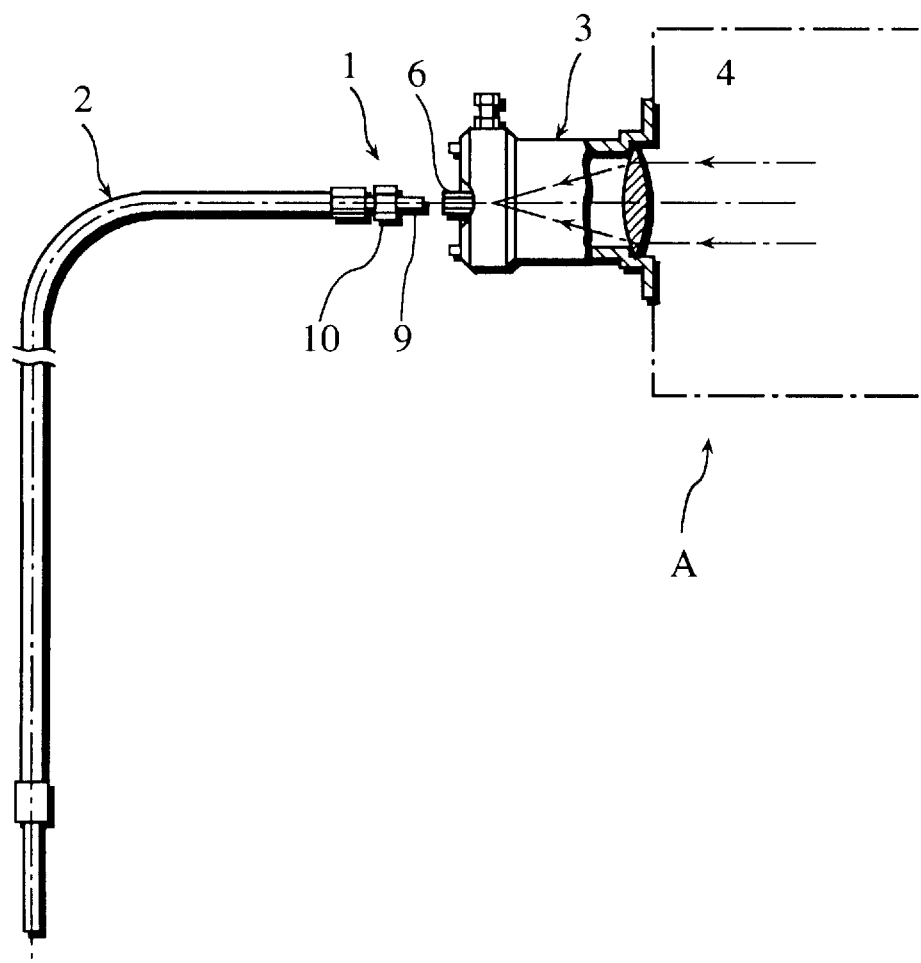
FIG. 1 is an explanatory view partially cutaway showing an embodiment of the present invention.
Figure 2:
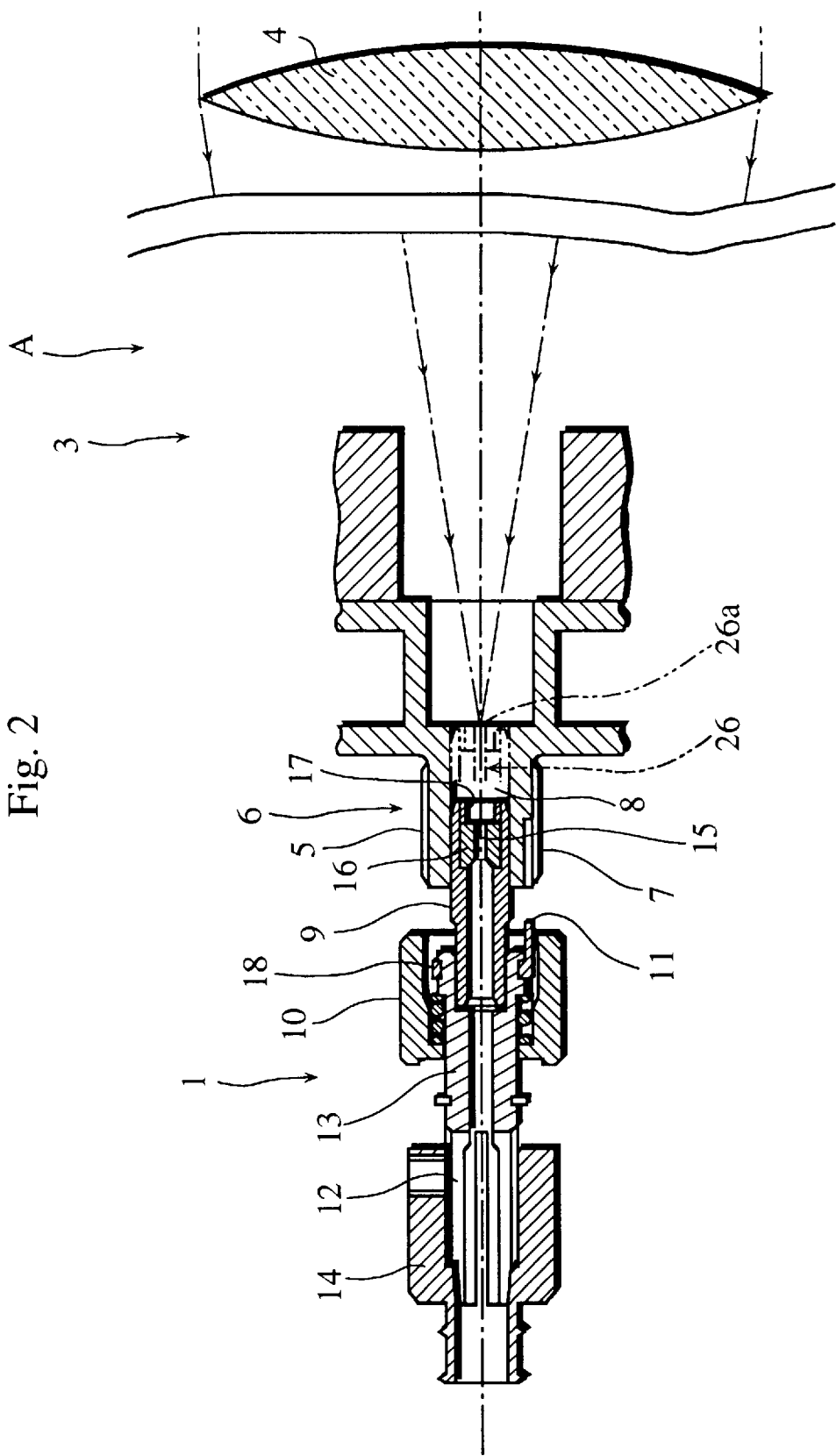
FIG. 2 is an enlarged sectional view of a principal portion of the embodiment.

FIG. 1 and FIG. 2 illustrate an optical fiber cord 2 in which an accurate connector 1 according to the present invention is fixed at an end of the optical fiber cord 2 and a connecting portion of a receptacle 3 attached to a high-energy laser apparatus such as a YAG laser.

The receptacle 3 as a counterpart member A where the connector 1 is detachably connected (attached) is provided with a built-in lens 4 and a projecting connected cylindrical portion 6 having a male screw portion 5 arranged on an outer circumference thereof.

A key way 7 is arranged on the outer circumference (the male screw portion 5) of the connected cylindrical portion 6, and the connector 1 includes a ferrule portion 9 for insertion into an axial hole portion 8 of the cylindrical portion 6, a cap nut 10 for engagement with the male screw portion 5, and a positioning key portion 11 for insertion into the key way 7.

Moreover, in this connector 1, as shown in FIG. 2, a base end portion of the ferrule portion 9 is pushed into and fixed at an end thereof, a connector main body 13 having a chuck portion 12 is arranged at a base end thereof, and a chuck nut 14 fits on an outer circumferential screw portion of the chuck portion 12 and freely screws back and forth.

A stepped hole is arranged along an axis of the ferrule portion 9 and has a larger diameter in a predetermined short distance from an end face of the ferrule portion 9, and a capillary 16 is inserted from a distal end side of the ferrule portion 9 to a stepped portion of the stepped hole, which capillary 16 is a heat resisting material made of, for example, sapphire and has an axial hole 15 of an extremely small diameter where an optical fiber is inserted. An end face of the capillary 16 is positioned at a slightly inner portion from the end face of the ferrule portion 9, and a thin ring 17 prevents the capillary 16 to slip off.

An outer layer, a Kevlar, and a jacket of the optical fiber cord are cut to predetermined lengths respectively, and the jacket, the Kevlar, and the optical fiber are exposed in tiers, and this optical fiber cord is inserted from left in FIG. 2 and is fixedly connected to the connector 1 by fastening the chuck nut 14 with the optical fiber distal end portion slightly protruding toward the end from the capillary 16 (which is not illustrated in FIG. 2).

The solid lines in FIG. 2 show a condition in which the ferrule portion 9 of the connector 1 is being inserted into the axial hole portion 8 of the receptacle 3 as the counterpart member A. The distal end of the ferrule portion 9 is inserted to the position shown with two-dot chain lines and the key portion 11 is inserted into the key way 7, the ferrule portion 9 and the cylindrical portion 6 are kept at a fixed position in a circumferential direction, and the cap nut 10 is engaged and connected with the male screw portion 5.

As shown in FIG. 3 to FIG. 6, the key portion 11 is freely moved by stages to predetermined positions in a circumferential direction of the ferrule portion 9. In other words, the key portion 11 is fixed to be freely moved for every predetermined central angle (at regular intervals of 60° in central angle in the illustration) in a circumferential direction of the ferrule portion 9.

Figure 4:
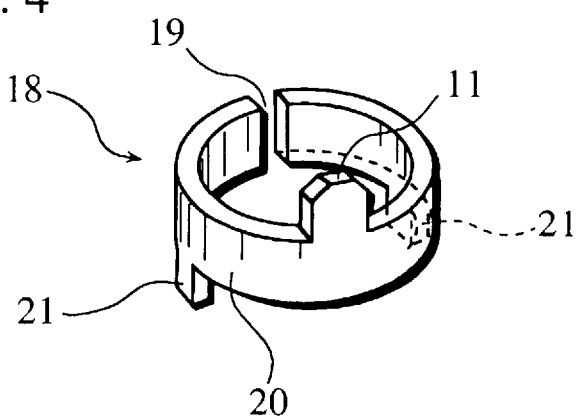
FIG. 4 is a perspective view showing an example of a key ring.
Figure 5:
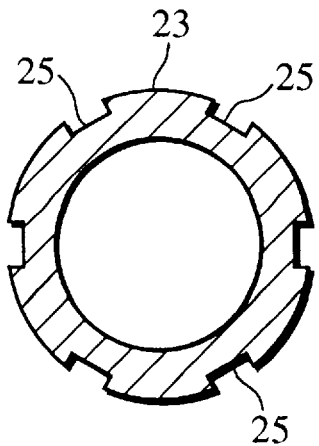
FIG. 5 is a section taken on line V—V in FIG. 3.
Figure 6:
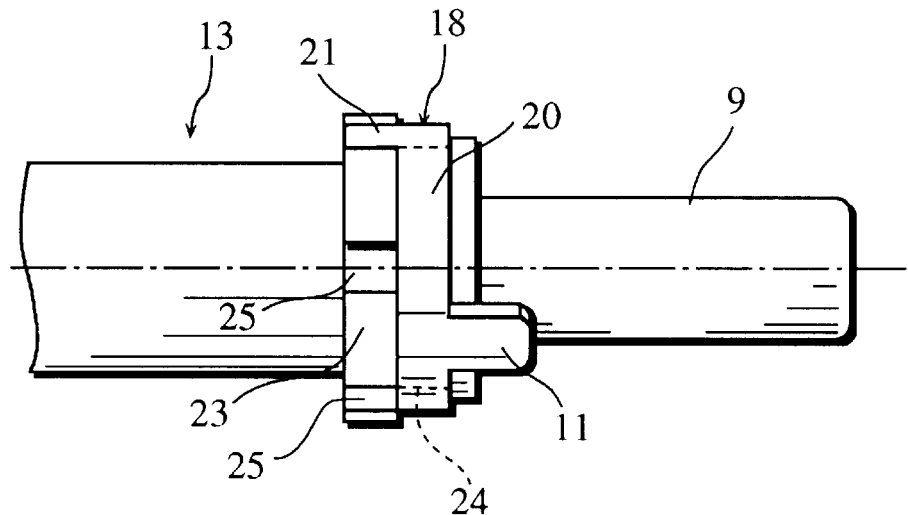
FIG. 6 is an enlarged side view of a principal portion showing an assembled condition.

The key portion 11 is composed as a part of a key ring (a ring body with a key portion) 18 as shown in FIG. 4, and the key ring 18 comprises a fitting annular portion 20 having a slit 19, the key portion 11 protruding from the annular portion 20 toward a direction horizontal with an axis of the annular portion 20 (toward the distal end), and a pair of positioning legs 21 protruding from the annular portion 20 toward a direction horizontal with the axis of the annular portion 20 (toward the base end).

A low flange portion 22 and a grooved flange portion 23 are arranged side by side on an outer circumference of an end of the connector main body 13, and a circumferential groove 24 is formed between the flange portions 22, 23. The flange portions 22, 23 and the circumferential groove 24 between them function as a portion which corresponds to an inner portion of the cap nut 10 when the connector is assembled, and the annular portion 20 of the key ring 18 winds around (fits on) the circumferential groove 24. The flange portion 23 is provided with six positioning grooves 25 at regular intervals on the circumference (at 60° in central angle), and the positioning legs 21 of the key ring 18 are freely changed at every 60° in central angle and selectively inserted into grooves 25. The key portion 11 is thereby moved freely by stages at every 60° in central angle at predetermined positions in a circumferential direction of the ferrule portion 9.

Figure 3:
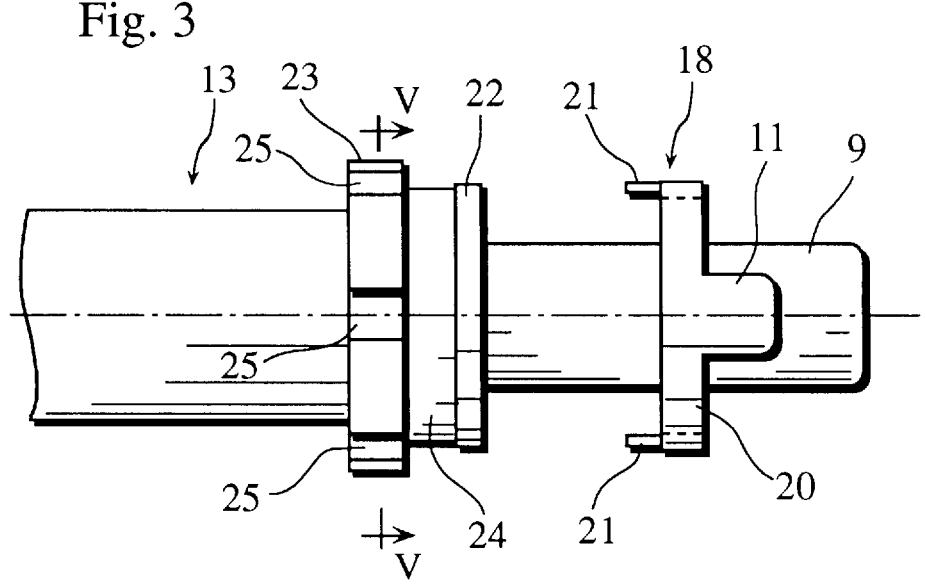
FIG. 3 is an enlarged side view of a principal portion.

FIG. 3 shows a condition just before the key ring 18 is fitted on the circumferential groove 24 utilizing plastic deformation or elastic deformation of the fitting annular portion 20. When the key ring 18 is fitted on the groove 24, the pair of positioning legs 21 are selectively inserted into (hitched at) two of the positioning grooves 25 at the same time.

Next, the circumferential directional position of the key portion 11 against the ferrule portion 9 is decided (selected) as explained below.

Figure 7A:
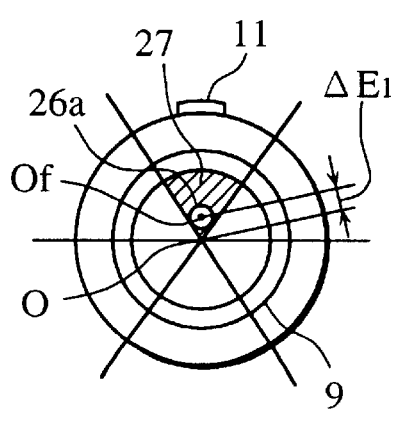
FIG. 7A is an explanatory view of an eccentric amount, a key portion and an eccentric position.
Figure 7B:
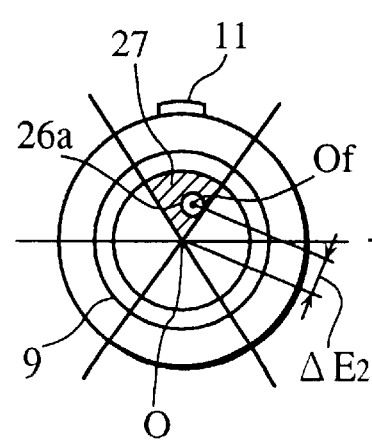
FIG. 7B is an explanatory view of an eccentric amount, a key portion and an eccentric position.
Figure 7C:
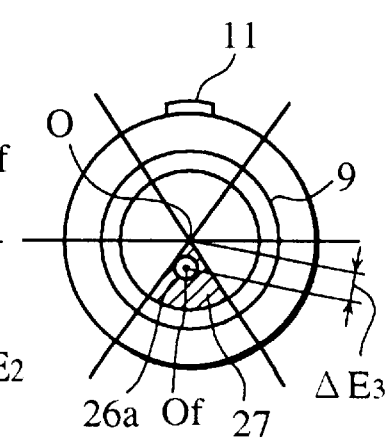
FIG. 7C is an explanatory view of an eccentric amount, a key portion and an eccentric position.

FIG. 7A, FIG. 7B, and FIG. 7C are enlarged explanatory views viewed from right in FIG. 3, in which an optical fiber distal end 26a is specially shown with a small circle, and eccentric amounts $\Delta E_1$, $\Delta E_2$, and $\Delta E_3$ of the optical fiber distal end 26a are illustrated in extreme exaggeration.

In an actual operation, when the optical fiber 26 is inserted into the ferrule portion 9, a center 0 of the axial hole 15 of the ferrule portion 9 does not coincide with an axis (a center $0_f$) of the optical fiber distal end 26a. For example, when observed through a magnifying glass or a magnifying projector, the center $0_f$ deviates toward a direction for a varied eccentric amount.

The key ring 18 is attached to the ferrule portion 9 so that the key portion 11 most approaches the eccentric side as illustrated in FIG. 7A and FIG. 7B. The center $0_f$ of the optical fiber distal end 26a thereby exists in an area 27 (shown with oblique lines) which ranges from a diametral directional line centering the key portion 11 toward left and right for 30° respectively and 60° in total as FIG. 7A or FIG. 7B.

As shown in FIG. 2, the connector 1 wherein the key portion 11 is arranged to correspond with the center $0_f$ of the optical fiber distal end 26a is inserted into the axial hole portion 8 of the connected cylindrical portion 6 of the counterpart member A (the receptacle 3), the key portion 11 is inserted to the key way 7, and after that, an optical axis of the optical fiber distal end 26a and an optical axis of the lens 4 are arranged to coincide with each other by minutely adjusting the lens 4 or the cylindrical portion 6 on a plane that intersects perpendicularly with the optical axis (optical axis adjustment).

The laser beam condensed through the lens 4 coincides with the center $0_f$ of the optical fiber distal end 26a and is efficiently incident into the optical fiber 26.

When the optical fiber cord (the optical fiber) and the connector have to be exchanged to a new optical fiber cord and a new connector (after a predetermined usage period), it is possible to omit bothersome optical axis adjustment by inserting a new optical fiber 26 and a new connector 1 into the cylindrical portion 6 of the counterpart member A (the receptacle 3) with the key portion 11 adjusted (through a magnifying glass or a magnifying projector) so that the center $0_f$ exists within the area 27 of 60° in central angle centering the key portion 11 as the foregoing FIG. 7A or FIG. 7B.

When the optical fiber 26 is inserted into the ferrule portion 9, on the assumption that the (simple) eccentric amount is 20 µm (on the assumption that $\Delta E_1$, $\Delta E_2$, and $\Delta E_3$ are 20 µm in FIG. 7A, FIG. 7B, and FIG. 7C), comparison between FIG. 7A and FIG. 7B shows that it is possible to prevent the relative eccentric amount to exceed 20 µm. In case of a conventional connector with a fixed key portion, when FIG. 7A and FIG. 7B are exchanged, the relative eccentric amount becomes 20µm×2=40 µm. Therefore, while optical axis adjustment is required again in using a conventional connector, it is possible to improve the relative eccentric amount to be approximately half or less and omit adjusting the optical axis again by using the connector 1 according to the present invention and arranging the key portion 11 to correspond with the optical fiber center $0_f$ as FIG. 7A and FIG. 7B. In other words, maintenance is not required in combining a YAG laser apparatus and an optical fiber.

Moreover, it is also possible to apply the present invention to a connecting portion between an optical fiber and an optical fiber (which application is not illustrated in the attached drawings). In some cases, a connector and a connector are mutually connected through a (middle) connection member (which corresponds to the counterpart member A). In such a case, explaining with reference to FIG. 7A, FIG. 7B, and FIG. 7C, in a conventional connection between connectors, FIG. 7A and FIG. 7C are combined in some cases, and on the assumption that eccentric amounts $\Delta E_1$ and $\Delta E_3$ are 20 µm at most, the maximum relative eccentric amount is the total of the eccentric amounts of FIG. 7A and FIG. 7C ($\Delta E_1 + \Delta E_3$), 40 µm. In the present invention, the key portion 11 is freely changed in a circumferential direction of the ferrule portion 9. Therefore, after observing which direction the center $0_f$ of the optical fiber distal end 26a deviates from the center $0_f$ of the axial hole 15 through a magnifying glass or a magnifying projector and coinciding the key portion 11 with (or bringing the key portion 11 close to) the eccentric position (by rotating the key portion 11), and after that, FIG. 7A and FIG. 7B can be connected mutually and the maximum relative eccentric amount is thereby less than $\Delta E_1$, $\Delta E_2$ (less than 20 μm).

Figure 8:
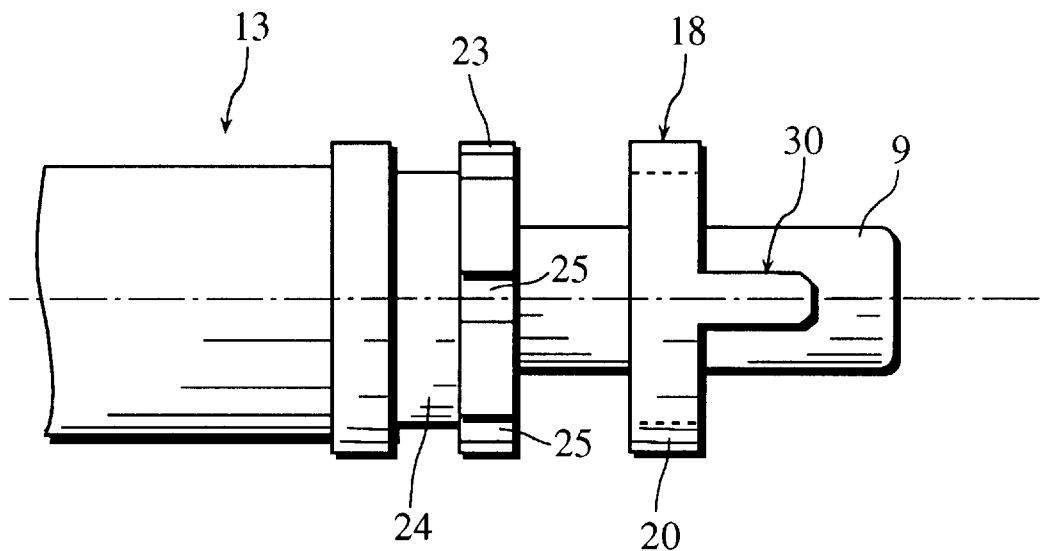
FIG. 8 is an enlarged side view showing another embodiment of the present invention.
Figure 9:
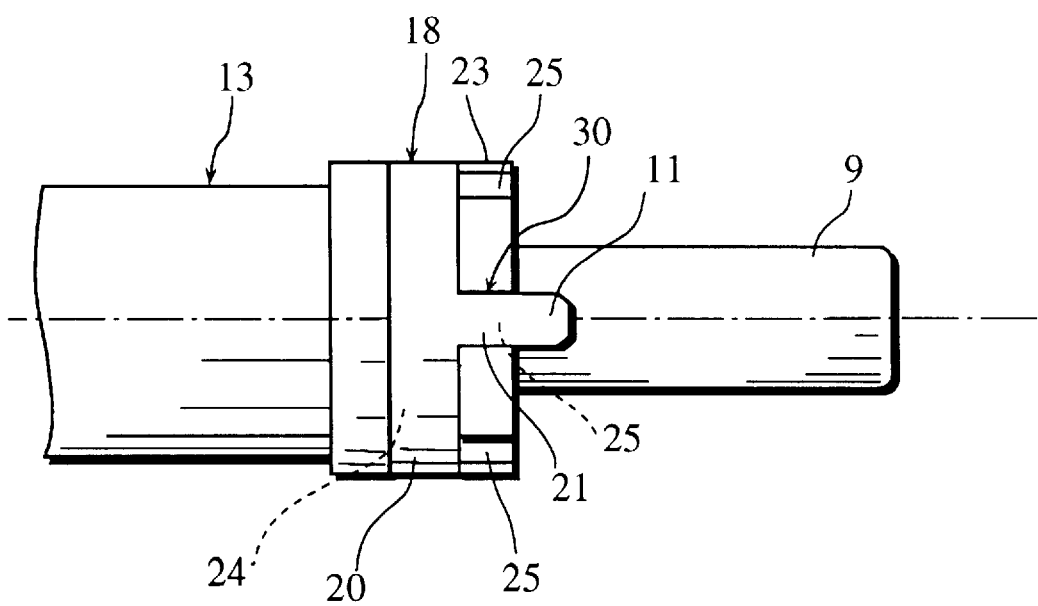
FIG. 9 is a side view of an assembled condition.
Figure 10:
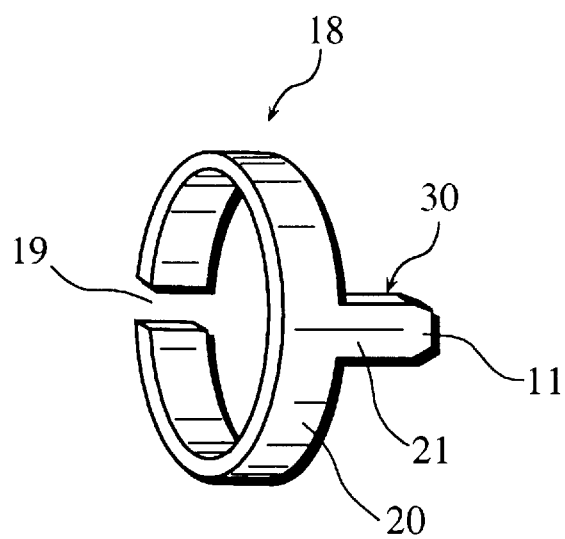
FIG. 10 is a perspective view showing another example of a key ring.

Next, FIG. 8 to FIG. 10 show another embodiment of the present invention. A key ring 18 possesses a fitting annular portion 20 having a slit 19 like the foregoing embodiment. One protruding piece portion 30 is formed only at one side margin in a direction of an axis of the annular portion 20 and functions both as a positioning leg 21 and a key portion 11.

A connector main body 13 is provided with a grooved flange portion 23 at a distal end side thereof, the annular portion 20 is fitted on a circumferential groove 24, the protruding piece portion 30 is inserted into a positioning groove 25 in an alternative way, a base end of the protruding piece portion 30 functions as the positioning leg 21, and a distal end portion thereof protruding toward the end functions as the key portion 11.

In FIG. 3 to FIG. 10, the key portion 11 can be circumferentially changed by stages at regular intervals of 60° in central angle, and it is also possible to arrange the key portion 11 to be circumferentially changed at smaller intervals. For example, it is possible to arrange small teeth with depressions and protrusions on an outer circumferential face of the connector main body 13 or a ferrule portion 9 and corresponding small teeth with depressions and protrusions on an inner circumferential face of the key ring 18 (like an internal gear). It is also possible to arrange at least one small hitching protrusion on the inner circumferential face and enable changing at minute angles by stages (which is not illustrated in the attached drawings).

In some cases, it is preferable to arrange the fitting annular portion 20 of the key ring 18 to be freely fastened by a fastening device which inner circumferential face is provided with a tapered portion in a chuck mechanism in which the annular portion 20 is freely rotated on an axis of the ferrule portion and fixed at any position so that the key portion can be freely moved and fixed at any position. That is to say, the relative eccentric amount can be reduced with higher accuracy.

It is possible to form the flange portions 22, 23 and the circumferential groove 24 in FIG. 3 and FIG. 8 directly on the ferrule portion 9 itself (which arrangement is not illustrated in the attached drawings).

The optic connector according to the present invention is used for an optical fiber for sending, for example, a high-energy YAG laser beam which is used to weld and cut metal, wherein a relative eccentric amount can be decreased and this prevents accidents such as abnormal generation of heat in the vicinity of an incident end face or welding of parts and increases transmission efficiency as a natural consequence, and it is possible to obtain enormous effects.

The present invention composed as described above provides the following enormous effects.

① The key portion 11 is easily changed to a position of a certain relation corresponding to the eccentric position of the center $0_f$ of the optical fiber distal end 26a. Optical axis adjustment can be thereby omitted in exchanging the connector and the optical fiber for the receptacle 3.

② In case of connecting optical fibers mutually, if a connector and a connector are connected so that a key portion 11 and a key portion 11 correspond with each other, the relative eccentric amount is decreased and the connection becomes highly accurate.

③ The construction is simple, and the key portion 11 is easily changed in position in circumferential direction corresponding to the eccentric position of the optical fiber distal end 26a.

While preferred embodiments of the present invention have been described in this specification, it is to be understood that the invention is illustrative and not restrictive, because various changes are possible within the spirit and indispensable features.

What is claimed is:

1. An optic connector for high-energy to be detachably attached to a connected cylindrical portion of a counterpart member which connected cylindrical portion possesses an axial hole portion, a male screw portion, and a key way, wherein the improvement comprises:

a ferrule portion to be inserted into said axial hole portion;

a cap nut to be engaged with said male screw portion; and a positioning key portion to be fixed on said ferrule portion or a connector main body to be freely changed in a circumferential direction of said ferrule portion and inserted into said key way, wherein the positioning key portion is fixed to be freely changed in the circumferential direction of the ferrule portion.

2. An optic connector for high-energy to be detachably attached to a connected cylindrical portion of a counterpart member which connected cylindrical portion possesses an axial hole portion, a male screw portion, and a key way, wherein the improvement comprises:

a ferrule portion to be inserted into said axial hole portion;

a cap nut to be engaged with said male screw portion;

a key ring possessing a positioning key portion to be inserted into said key way;

said key ring comprising a fitting annular portion having a slit, said key portion protruding from said annular portion, and a positioning leg protruding from said annular portion; and the key portion fixed to be freely changed in a circumferential direction of the ferrule portion at circumferential regular intervals in which a circumferential groove and positioning grooves at said circumferential regular intervals are formed on a portion, which corresponds to an inner portion of the cap nut, of said ferrule portion or a connector main body connected to said ferrule portion, the annular portion of said key ring fits on said circumferential groove, and said positioning leg of the key ring is inserted into said positioning grooves selectively.

* * * * *